United States Patent
Kuroki et al.

(10) Patent No.: US 7,585,011 B2
(45) Date of Patent: Sep. 8, 2009

(54) LEG COVERING STRUCTURE FOR FOLDING SEAT

(75) Inventors: Yohei Kuroki, Shizuoka-ken (JP); Yuki Atsumi, Shizuoka-ken (JP); Masaya Yoshitsuru, Shizuoka-ken (JP); Fumiaki Matsushita, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 12/241,902

(22) Filed: Sep. 30, 2008

(65) Prior Publication Data

US 2009/0102223 A1    Apr. 23, 2009

(30) Foreign Application Priority Data

Oct. 17, 2007    (JP) .............................. 2007-270038

(51) Int. Cl.
    *B60N 2/02*    (2006.01)
(52) U.S. Cl. ................................... 296/65.09
(58) Field of Classification Search ............. 296/65.09, 296/65.03, 63, 69; 297/16.1, 31, 423.26, 297/423.1, 423.19; 403/109; 108/132
    See application file for complete search history.

(56) References Cited

U.S. PATENT DOCUMENTS

| | | | | |
|---|---|---|---|---|
| 5,383,699 | A | * | 1/1995 | Woziekonski et al. ..... 296/65.09 |
| 5,482,349 | A | * | 1/1996 | Richter et al. .................. 297/15 |
| 6,123,380 | A | * | 9/2000 | Sturt et al. ................ 296/65.09 |
| 6,827,394 | B2 | * | 12/2004 | Watanabe et al. .............. 297/15 |
| 7,201,426 | B2 | * | 4/2007 | Villeminey ............... 296/65.09 |
| 7,240,950 | B2 | * | 7/2007 | Fourrey et al. ................. 296/66 |
| 7,255,384 | B2 | * | 8/2007 | Saberan et al. ........... 296/65.09 |
| 7,267,406 | B2 | * | 9/2007 | Sturt ..................... 297/378.12 |
| 7,290,822 | B2 | * | 11/2007 | Villeminey ............... 296/65.09 |
| 7,469,952 | B2 | * | 12/2008 | Luttinen et al. .......... 296/65.09 |
| 2003/0071492 | A1 | * | 4/2003 | Watanabe et al. ............. 297/15 |
| 2005/0269830 | A1 | * | 12/2005 | Epaud ..................... 296/65.09 |
| 2007/0210601 | A1 | * | 9/2007 | Phillips et al. ........... 296/37.14 |
| 2008/0203796 | A1 | * | 8/2008 | Picker et al. ................. 297/341 |

FOREIGN PATENT DOCUMENTS

| | | |
|---|---|---|
| JP | 2000-108745 | 4/2000 |
| JP | 2006-082709 | 3/2006 |

* cited by examiner

*Primary Examiner*—Kiran B. Patel
(74) *Attorney, Agent, or Firm*—Myers Bigel Sibley & Sajovec, P.A.

(57) ABSTRACT

A folding seat 1 is provided with a leg 4, the leg having a movable hinge portion 42a at the lower end thereof, the movable hinge portion is pivotally connected to a fixed hinge portion 61 on a vehicle body floor 5 so that the leg can tilt down forward to fold the seat on the vehicle body floor The covering structure for the leg 4 includes a leg cover 7 mounted on the leg to cover the leg front surface and the movable hinge portion, and a hinge cover 8 mounted on the vehicle body floor side to cover the fixed hinge portion. The hinge cover has engagement grooves 82 engaging with a movable hinge covering portion of the leg cover so as to allow pivoting of the movable hinge covering portion. The movable hinge covering portion is provided with an engagement edge 72a on the lateral portion thereof so as to be slidably under the inner periphery side of an inside edge 82a of the engagement groove.

6 Claims, 10 Drawing Sheets

LEG COVERING STRUCTURE FOR FOLDING SEAT

CROSS-RELATED APPLICATIONS

This application claims priority from Japanese Patent Application No. 2007-270038; filed Oct. 17, 2007, the disclosure of which is incorporated herein by reference in its entirety.

FIELD OF THE INVENTION

The present invention relates to a leg covering structure for a folding seat; the seat is provided with a leg, the leg having a movable hinge portion at the lower end thereof, and the movable hinge portion pivotally connected to a fixed hinge portion on a vehicle body floor so that the leg can tilt down forward to fold the seat on the vehicle body floor.

BACKGROUND OF THE INVENTION

Conventionally, in some cases, a folding seat has been provided at the rear seat of a vehicle, such as a station wagon type car in which the rear part of a vehicle compartment is utilized as a cargo space. The folding seat is arranged at the front end part of the cargo space floor located in an upper level with respect to a vehicle body floor (the upper level floor) at the seating position thereof. In this state, a seat back of the folding seat is folded down and laid on a seat cushion, and the seat back and seat cushion descend onto the vehicle body floor (the lower level floor) and are folded such that the back surface of the folded seat back is utilized as a space for the cargo space floor (refer to JP2000-108745A).

Such a folding seat is provided with a leg that is pivotally connected to the front bottom part of the seat cushion and the vehicle body floor so as to be able to tilt down forward. This leg is primarily formed by a structural element such as a pipe frame, and in some cases, a member for controlling the folding operation is additionally provided. Since the leg is arranged at a location that is easily visible to the passenger, to improve the appearance of the interior of the passenger compartment, research has been conducted in which the leg is covered with a cover.

On the other hand, JP2006-82709 discloses a folding seat configured such that a seat back is folded onto a seat cushion, and the seat back and seat cushion in this state are turned backward and folded, wherein a flip-up type front leg is covered with a cover. However, in the folding system as described in JP2000-108745A, since the lower end of the front leg is pivotally connected to the vehicle body floor, it is difficult to directly cover the leg with a cover as described in JP2006-82709.

BRIEF SUMMARY OF THE INVENTION

The present invention was made in view of the above-described circumstances, and accordingly, an object thereof is to provide a leg covering structure for a folding seat that can improve the appearance of a main portion, including a pivotally connecting portion, by covering this portion without hindering the pivoting operation of a leg that can tilt down forward for folding.

To achieve the above object, the present invention provides leg covering structure for a folding seat, the seat provided with a leg, the leg having a movable hinge portion at the lower end thereof, the movable hinge portion pivotally connected to a fixed hinge portion on the vehicle body floor so that the leg can tilt down forward to fold the seat on a vehicle body floor, the structure comprising: a leg cover mounted on the leg to cover the front surface of the leg and the movable hinge portion; and a hinge cover mounted on the vehicle body floor to cover the fixed hinge portion; wherein the hinge cover has an engagement groove engaging with a movable hinge covering portion of the leg cover so as to allow pivoting of the movable hinge covering portion, and the movable hinge covering portion is provided with an engagement edge on the lateral portion thereof so as to be slidably under the inner periphery side of an inside edge of the engagement groove.

Since the leg covering structure for a folding seat in accordance with the present invention is configured as described above, a wide range from the lower part of the seat to the floor surface including the pivoting connection part of the leg can be covered by the hinge cover and the leg cover engaging movably with each other without hindering the pivoting operation of the leg, so that a good appearance is obtained, and also the position of the engagement edge of the movable hinge covering part at the lower end of the leg cover is regulated by the inside edge of the engagement groove of the hinge cover. Therefore, by the installation of the hinge cover, the leg cover can be prevented from being lifted up and coming off. The leg covering structure of a folding seat in accordance with the present invention is advantageous in employing a simple mounting method, such as snap fitting, to the installation of the covers, and a good appearance can be realized and maintained at a low cost.

In a mode in which, in the present invention, at the tip end of the movable hinge covering portion, a projecting edge located under the edge portion corresponding to the engagement groove is provided at the pivoting end of the leg corresponding to the seating position of the seat, this projecting edge and the engagement edge described previously are regulated by the edge part in two directions of the engagement groove of the hinge cover. Therefore, the movable hinge covering part that pivots together with the leg can be reliably prevented from being lifted up.

In a mode in which, in the present invention, the leg has the two movable hinge portions provided in parallel and coaxially; the vehicle body floor is provided with a hinge bracket having the two fixed hinge portions corresponding to the movable hinge portions; the leg cover has the two movable hinge covering portions corresponding to the movable hinge portions; the hinge cover has the two engagement grooves corresponding to the movable hinge covering portions; the engagement edge is provided in each of the side portions of the movable hinge covering portions; and the projecting edge provided at each of the tip end portions of the movable hinge covering portions, the leg having the two movable hinge parts can be covered with one leg cover, and at the same time, the hinge bracket having the two fixed hinge parts can be covered with one hinge cover.

In the above-described mode, if in an intermediate portion of the hinge cover located between the engagement grooves, an intermediate projecting edge located under the intermediate edge at the lower end of the leg cover extending between the movable hinge covering portions is provided at the pivoting end of the leg corresponding to the seating position of the seat, the intermediate part of the hinge cover is regulated by the intermediate edge at the lower end of the leg cover, by which the hinge cover and the leg cover are regulated by each other in the engagement part thereof, so that the rising up and the disengagement can be prevented more effectively.

Also, in the present invention, in the case in which a spiral spring is mounted on the pivot axis of the movable hinge portion so as to exert a restoring force toward the pivoting position corresponding to the seating position of the seat when the leg is tilted down forward, the spiral spring covered with the movable hinge covering portion, the spiral spring is advantageously covered with the movable hinge covering part.

Also, in a mode in which the seat comprises a seat cushion arranged in the upper level part of the vehicle body floor at the seating position, and a seat back connected to the rear portion of the seat cushion so as to be folded forward; the upper end of the leg is pivotally connected to the bottom of the seat cushion; and in a state in which the seat back is folded forward and laid on the seat cushion, the leg is tilted forward, whereby the seat can be folded in the lower level part of the vehicle body floor, and on the other hand, in the seating position of the seat, the leg is arranged along the slant surface between the upper level part and the lower level part of the vehicle body floor, the leg cover surface can advantageously be formed so as to have an appearance in harmony with the tilt surface.

DETAILED DESCRIPTION OF THE INVENTION

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Hereinafter, preferred embodiments of the present invention will be described. However, it is to be understood that the present invention is not limited thereto.

An embodiment of the present invention will now be described in detail with reference to the accompanying drawings.

Figure 1:
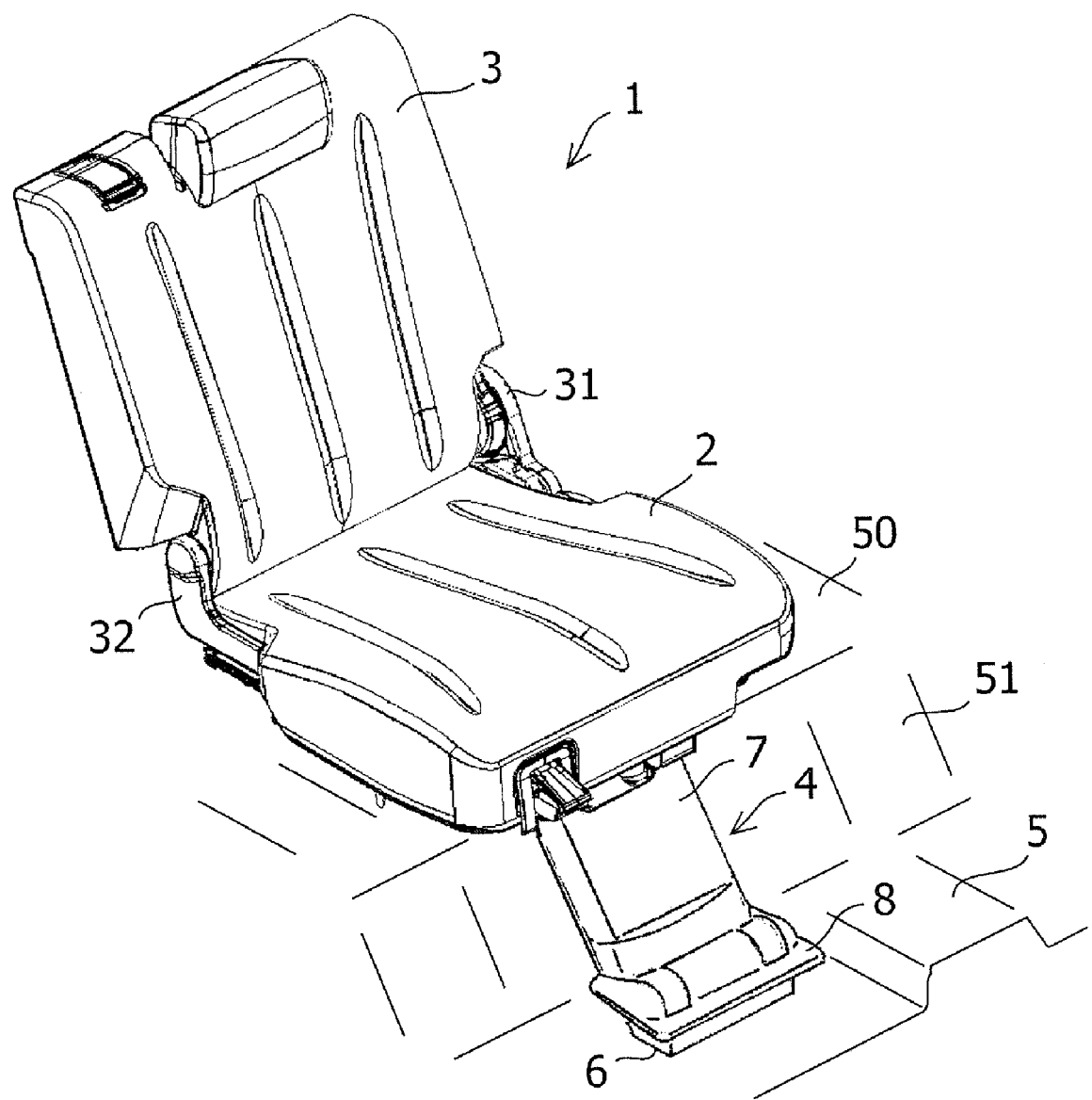
FIG. 1 is a perspective view of a folding seat provided with a leg covering structure in accordance with an embodiment of the present invention.
Figure 2:
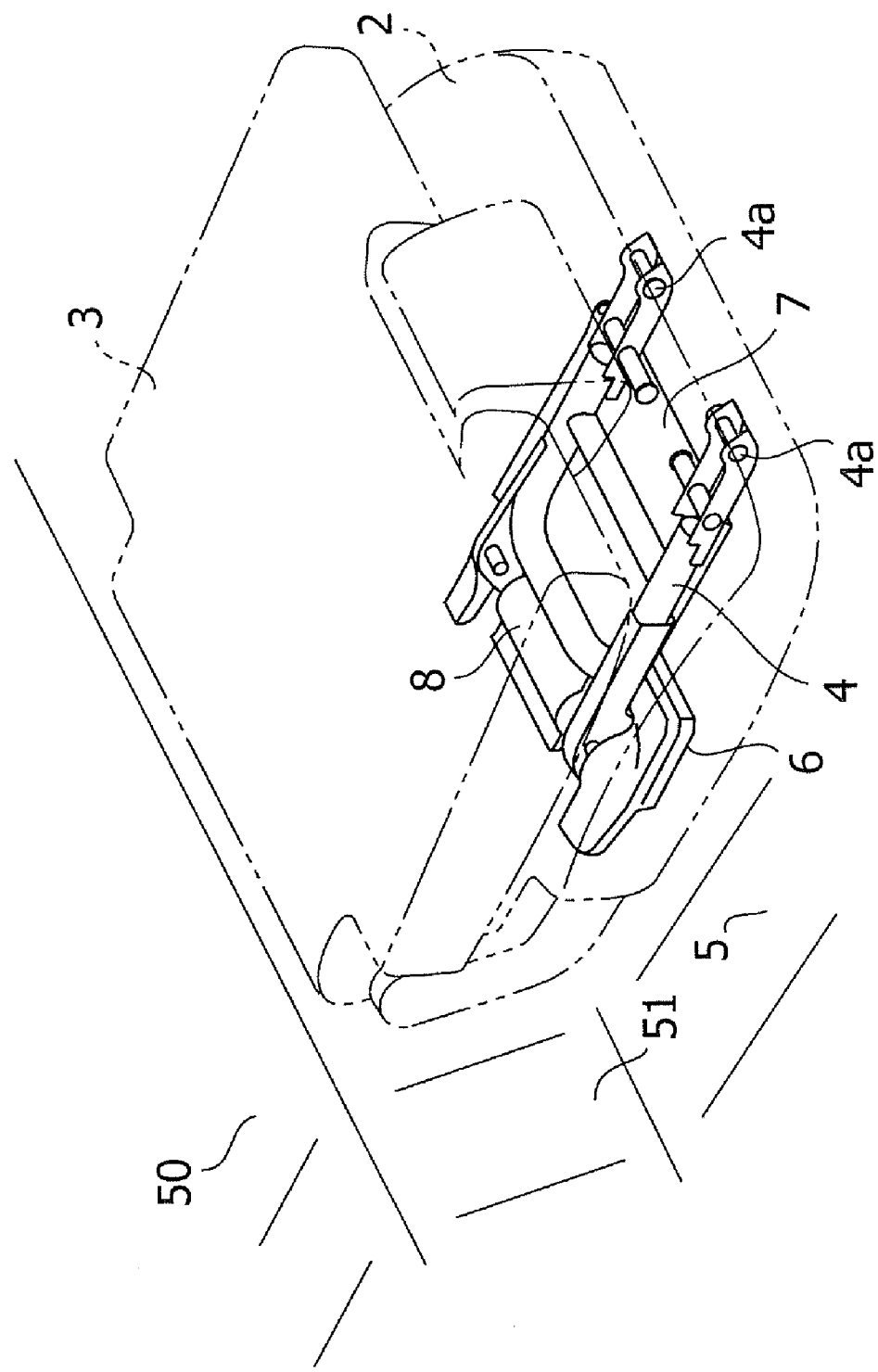
FIG. 2 is a perspective view showing a folded state of a leg.

FIG. 1 shows a folding seat 1 to which a leg covering structure in accordance with the present invention is applied, and FIG. 2 shows a folded state of a leg. The folding seat 1 shown in FIG. 1 is a rear seat of a type in which the seat is separated into right and left foldable parts. The figures show only one part of the folding seat 1. In FIG. 1, the seat 1 is made up of a seat cushion 2 and a seat back 3 connected to the rear part of the seat cushion 2 via hinge mechanisms 31 and 32 so as to be folded forward. One hinge mechanism 31 is additionally provided with a reclining mechanism.

The seat cushion 2 is formed by overlapping a cushion pad on the upper side of a cushion frame, not shown, and by covering the surface thereof with a covering material. The seat cushion 2 is provided with a leg 4 in the lower portion close to the front end of the seat cushion 2, which is placed at a floor upper level part 50 (the front end part of a cargo space floor) at the seating position, the leg 4 can tilt down forward to store the seat 1 in a folded state on a vehicle body floor 5 (floor lower level part).

Figure 3:
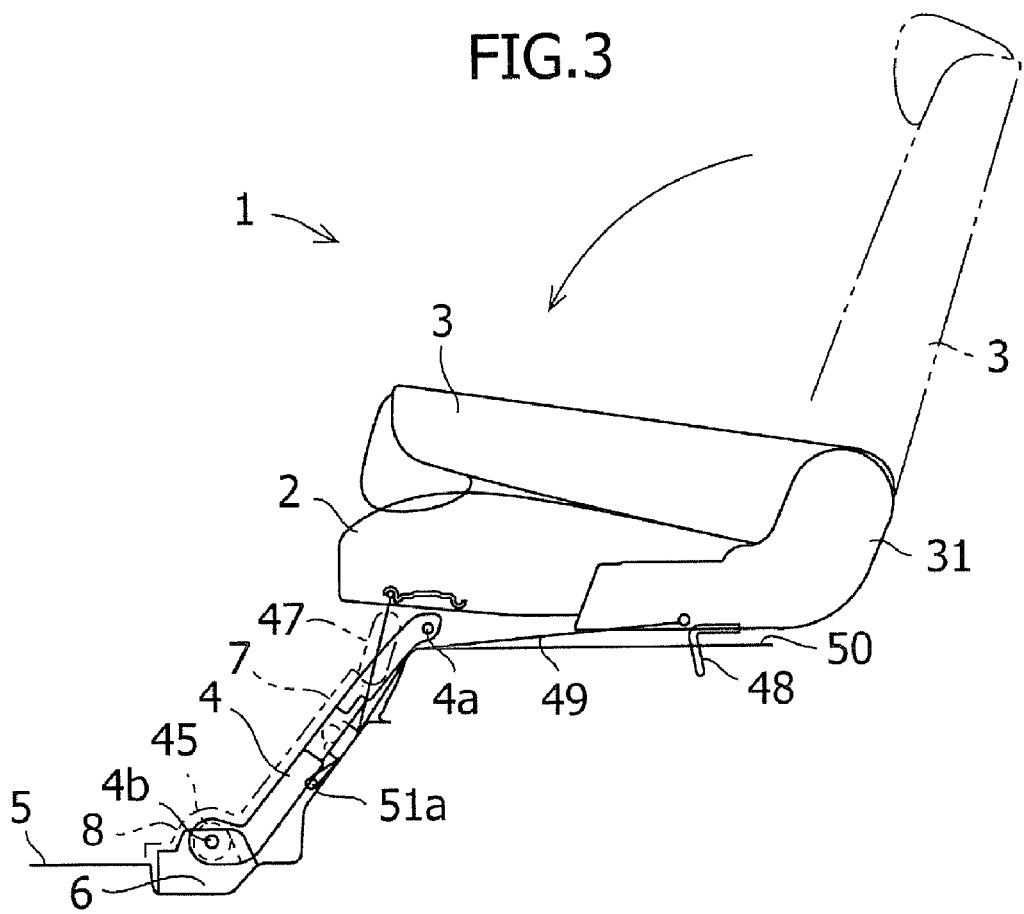
FIG. 3 is a side view showing a folding operation from a seating position of a folding seat.
Figure 4:
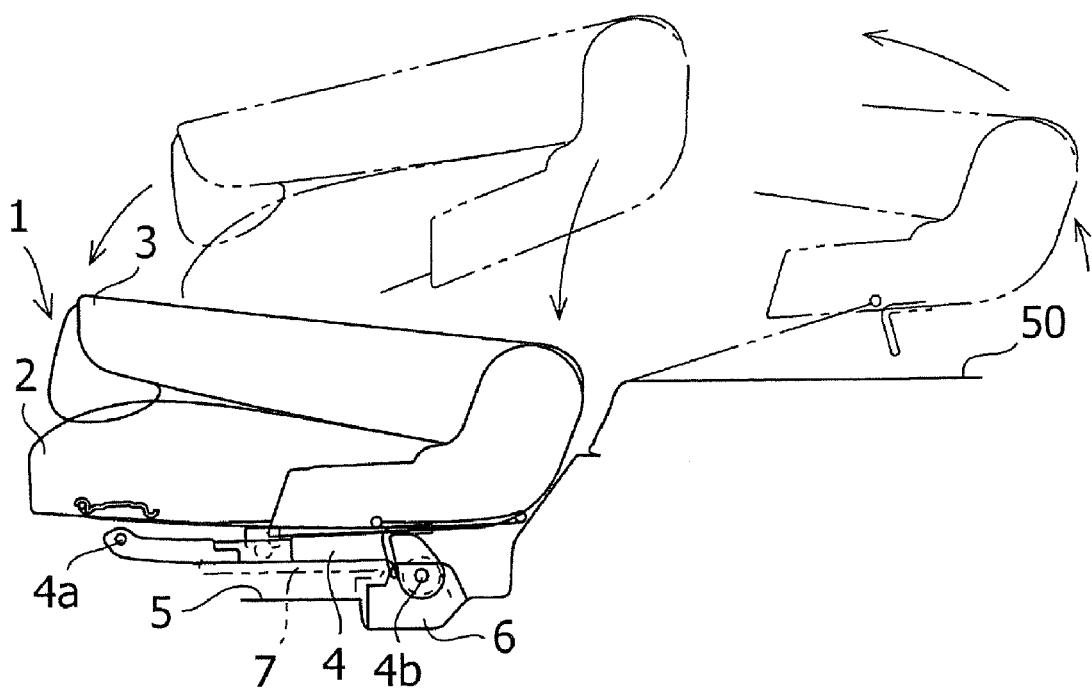
FIG. 4 is a side view showing a storing operation onto a floor of a folding seat.

As shown in FIGS. 2 to 4, the leg 4 is configured so that a hinge portion 4a at the upper end thereof is pivotally connected to the bottom portion of the seat cushion 2 (cushion frame), and on the other hand, hinge portions 4b at the lower end thereof are pivotally connected to a hinge bracket 6 provided on the vehicle body floor 5. A leg cover 7 is mounted in the front portion of the leg 4, and a hinge cover 8 is mounted in the upper portion of the hinge bracket 6. The leg cover 7 and hinge cover 8 form a continuous covering structure extending from the upper portion of the leg 4 to the vehicle body floor 5. The detailed constructions of the leg cover 7 and the hinge cover 8 are described later. First, the basic construction and folding operation of the leg 4 are explained.

As shown in FIGS. 2 to 5, the leg 4 is constructed so that hinge members 41 and 42 are fixed to the upper and lower ends on both sides, right and left, of a pipe frame 40 bent into a U shape, respectively, and a reinforcing frame 43 is provided in an intermediate portion in the up and down direction so as to reinforce the pipe frame 40, by which the leg 4 is formed in a ladder shape overall. Also, a pad member 44 is provided on the back surface side of the reinforcing frame 43, the pad member 44 comes into contact with a slant surface 51 (elevation surface) between the vehicle body floor 5 and the floor upper level part 50 at the pivoting end corresponding to the seating position of the leg 4, and holds the leg 4 at this position as shown in FIG. 3.

The leg 4 is pivotally connected to the hinge bracket 6 via a hinge axis 4b (bolt) on the lower end of the leg 4, the hinge axis 4b is inserted into a bearing hole formed in a fixed hinge portion 61 of the hinge bracket 6, and is threadedly fastened to a weld nut 4c fixed to the hinge member 42 (movable hinge portion) on the lower end of the leg 4.

Also, the weld nut 4c is integrally formed with an axis portion that is mounted with a support spring 45 (spiral spring). When the leg 4 is located at the pivoting end corresponding to the seating position of the seat 1, the outer periphery end of the support spring 45 is supported by a pin 46 projectingly provided on the hinge member 42. When the leg 4 is pivoted to the lower front for storage of the folded seat 1, the outer periphery end of the support spring 45 leaves the pin 46 and is hooked by a support piece 66 of the hinge bracket 6. Thereby, the support spring 45 is elastically deformed to assist the operation for returning the seat 1 from the stored position to the seating position by means of the restoring force thereof.

On the other hand, a spring 47 is stretched between the hinge member 41 on the upper end of the leg 4 and a hinge bracket of the cushion frame, not shown, to prevent relocking (FIG. 3). This spring 47 biases the seat cushion 2 in the direction such that the seat cushion 2 is pivoted to the upper front with respect to the leg 4 around the hinge axis 4a, and raises the rear portion of the seat cushion 2 so not as to relock when a lock mechanism 48 is unlocked. Furthermore, a posture control belt 49 is inserted through a guide member 51a provided on the floor slant surface 51, and connected at two front and rear bottom portions of the seat cushion 2.

When the folded seat 1 is stored, the seat back 3 is folded forward from the seating position shown in FIG. 3 (or FIG. 1) and is laid on the seat cushion 2. When the lock mechanism 48 is unlocked, the rear portion of the seat cushion 2 is lifted from the floor upper level part 50 by the biasing force of the spring 47. If the seat 1 is pushed forward in this state, the leg 4 pivots forward around the hinge axis 4b on the lower end thereof. The seat 1 comes down while keeping an approximately horizontal posture by means of the posture control belt 49, and is stored on the vehicle body floor 5 as shown in FIG. 4 (or FIG. 2).

The leg cover 7, which covers the leg 4 of a folding seat 1 configured so as to be capable of being stored by being folded as described above, and the hinge cover 8, which covers the hinge bracket 6, form a continuous covering structure that covers the mechanical part arranged from the upper portion of the leg 4 to the vehicle body floor 5 without hindrance of the pivoting operation of the leg for folding. Hereinbelow, details of the leg cover 7 and the hinge cover 8 are explained with reference to the drawings.

Figure 5:
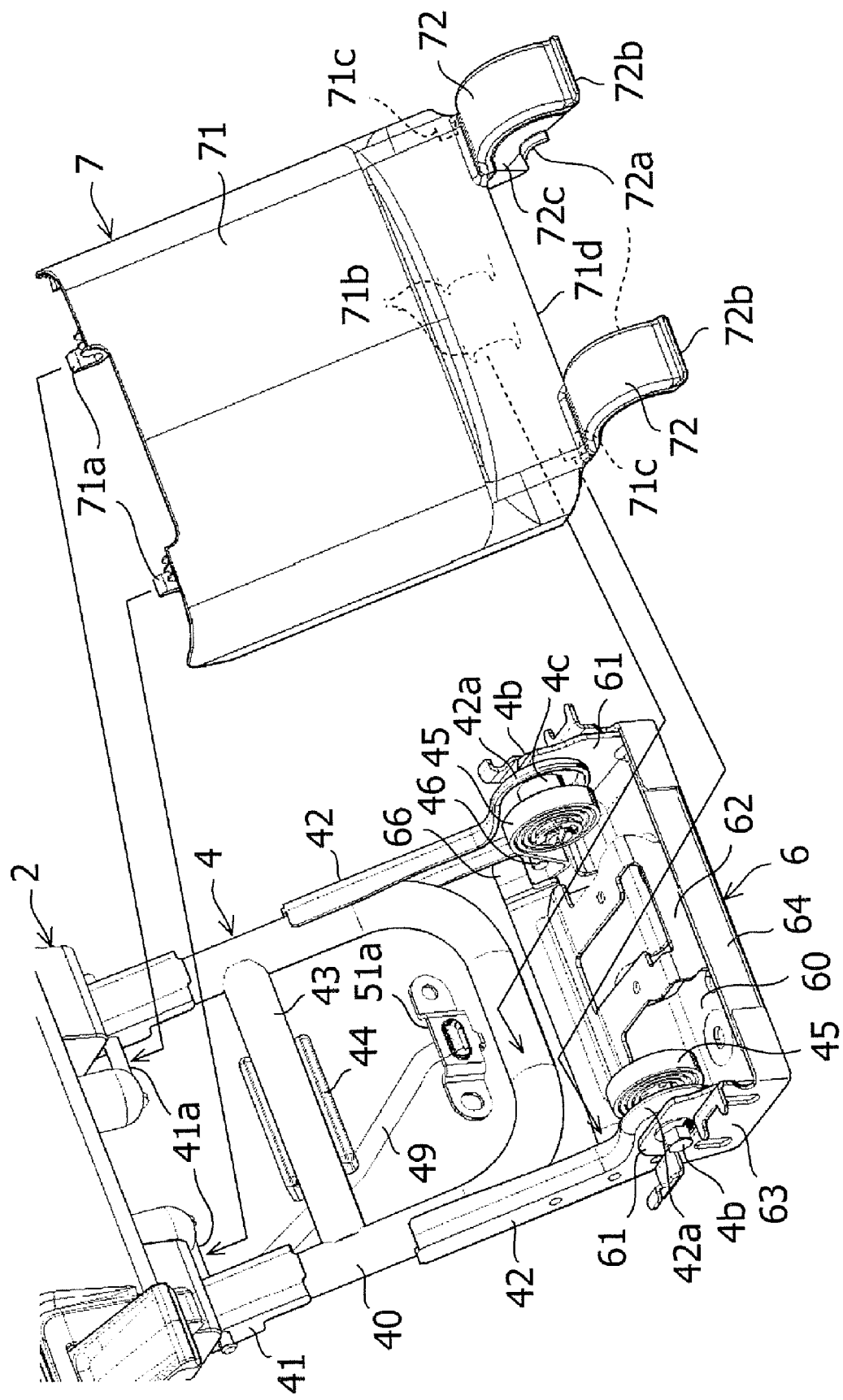
FIG. 5 is a perspective view showing a procedure for mounting a leg cover in accordance with an embodiment of the present invention.

FIG. 5 is a perspective view showing the installation of the leg cover 7. The leg cover 7 is mounted onto the front side of the leg 4 before the hinge cover 8 is mounted. In FIG. 5, the leg cover 7 includes a body 71 for covering the front side of a main frame of the leg 4 consisting of the pipe frame 40, and a pair of right and left movable hinge covering portions 72 for covering movable hinge covering portions 42a of the hinge member 42, which are extended from the lower end of the body 71.

Each movable hinge covering portion 72 is basically formed into a partial cylindrical shape that can cover substantially upper half portions of the movable hinge portion 42a and the support spring 45, and is provided with a substantially sector formed lateral surface 72c on the side on which the movable hinge covering portions 72 face each other. An engagement edge 72a is projected from the central portion of the sector formed lateral surface 72c, the engagement edge 72a formed with an arcuate shape around the hinge axis 4b. Also, projecting edges 72b extend forward from tip ends of the movable hinge covering portions 72.

The leg cover 7 further comprises hooks 71a projected from two right and left portions on the back side in the upper end of the body 71, holders 71b projected from two portions on the back side in the lower portion of the body 71, and locking claws 71c projected from the back side in both lateral portions of the body 71. On the other hand, the leg 4 comprises pins 41a projected on the hinge member 41 on the upper end thereof. The leg cover 7 configured as described above is mounted to the leg 4 as follows. First, the hooks 71a are engaged from the downside with pins 41a, and then the leg cover 7 is turned around the pins 41a to fit holders 71b on the pipe frame 40, and locking claws 71c are engaged with the edges of the hinge members 42.

Figure 6:
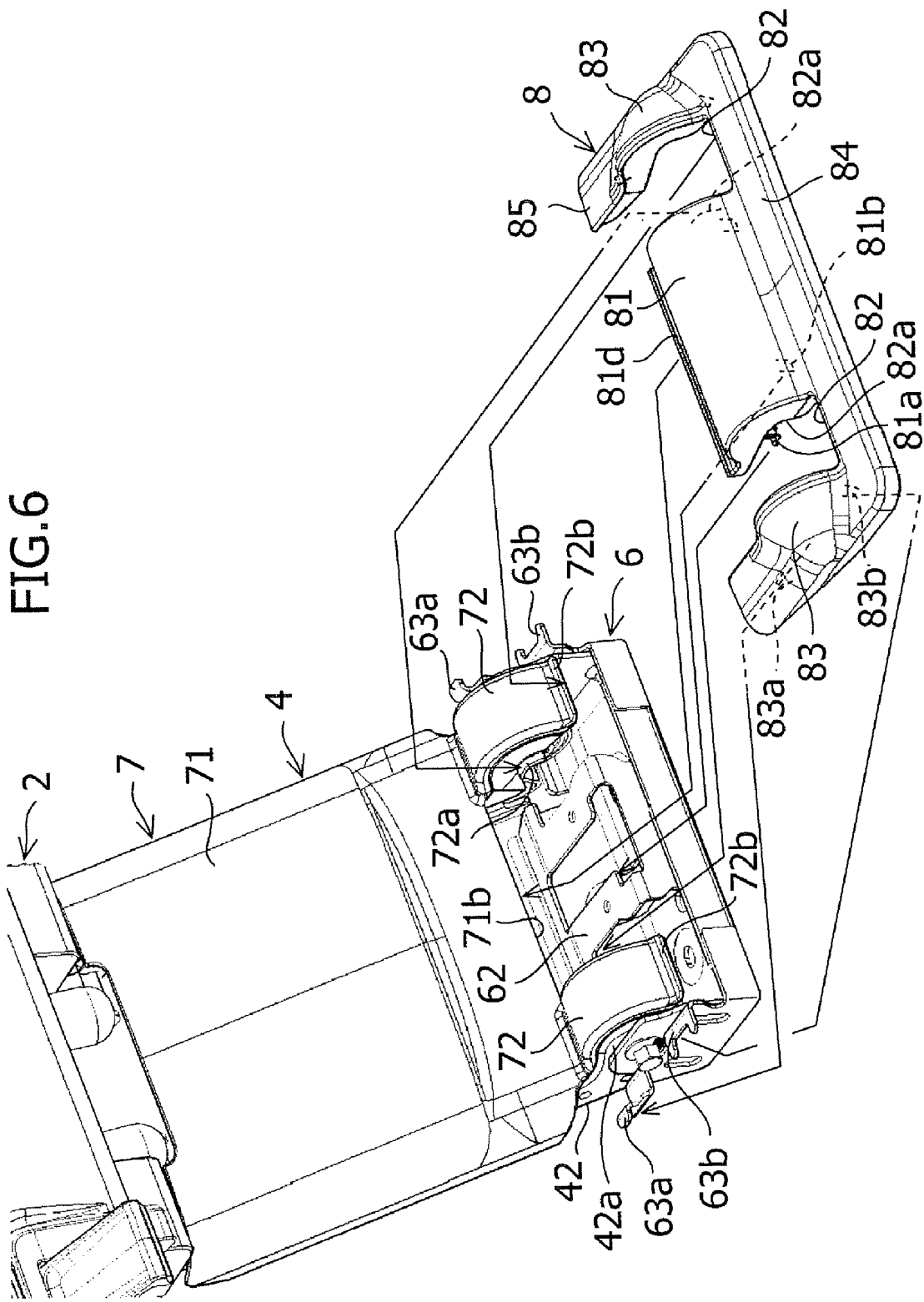
FIG. 6 is a perspective view showing a procedure for mounting a hinge cover in accordance with an embodiment of the present invention.

FIG. 6 shows a mounted state of the leg cover 7. In this mounted state, the holders 71b can regulate the position in the up and down direction of the leg cover 7. However, because of the engagement with the cylindrical pipe frame 40, the joining force is relatively weak. If an intermediate edge 71d at the lower end of the leg cover 7 is pulled toward the front, the leg cover 7 comes off easily. If the intermediate edge 71d at the lower end is further pulled toward the front, the intermediate edge 71d at the lower end is curved, by which the locking claws 71c both facing to the outside are tilted toward the center side and come off the edges of the hinge members 42. Therefore, if the hinge cover 8 described below is removed, the leg cover 7 can be removed easily.

Figure 8:
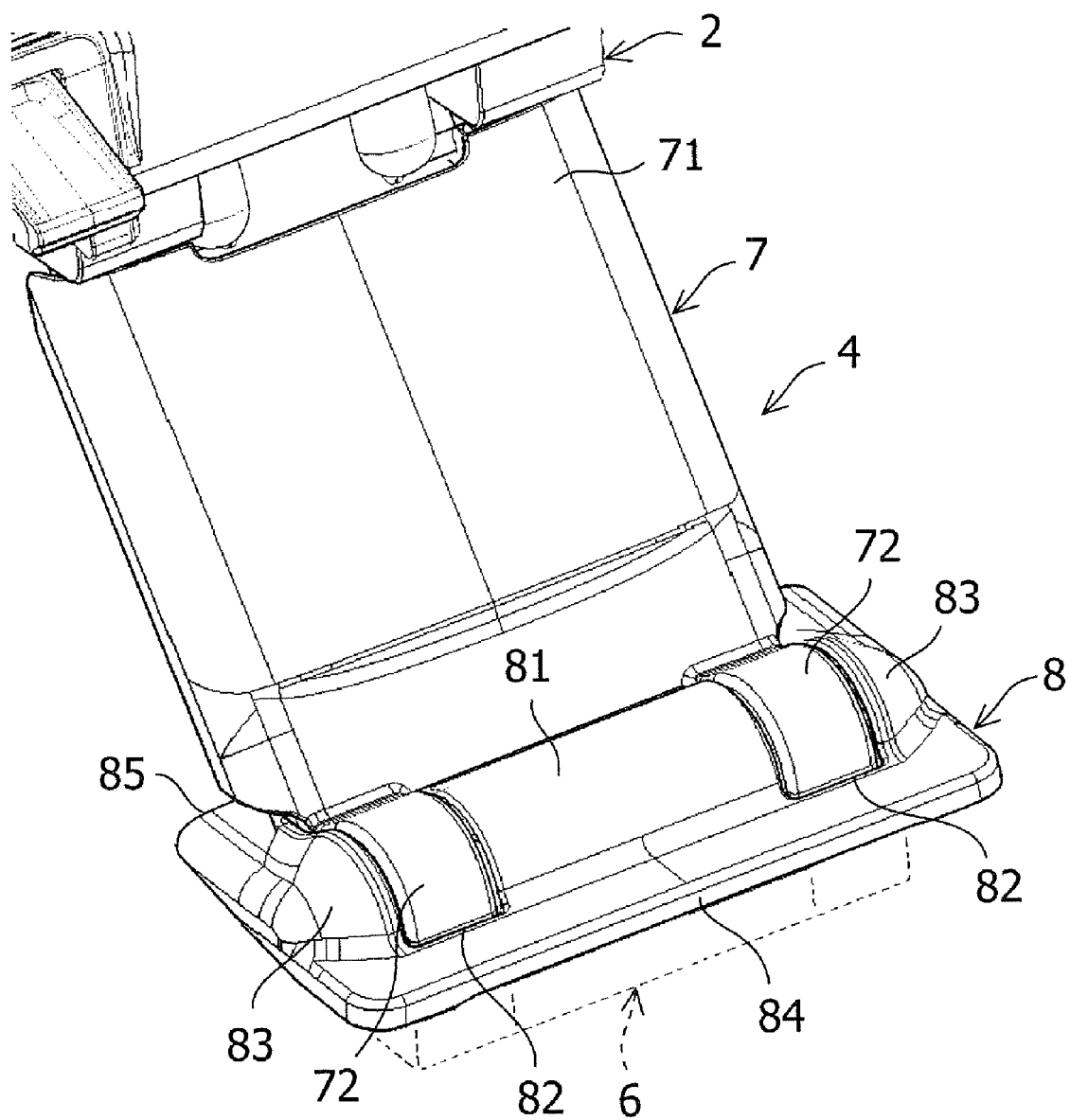
FIG. 8 is a perspective view showing a mounted state of a leg cover and a hinge cover in accordance with an embodiment of the present invention.
Figure 9:
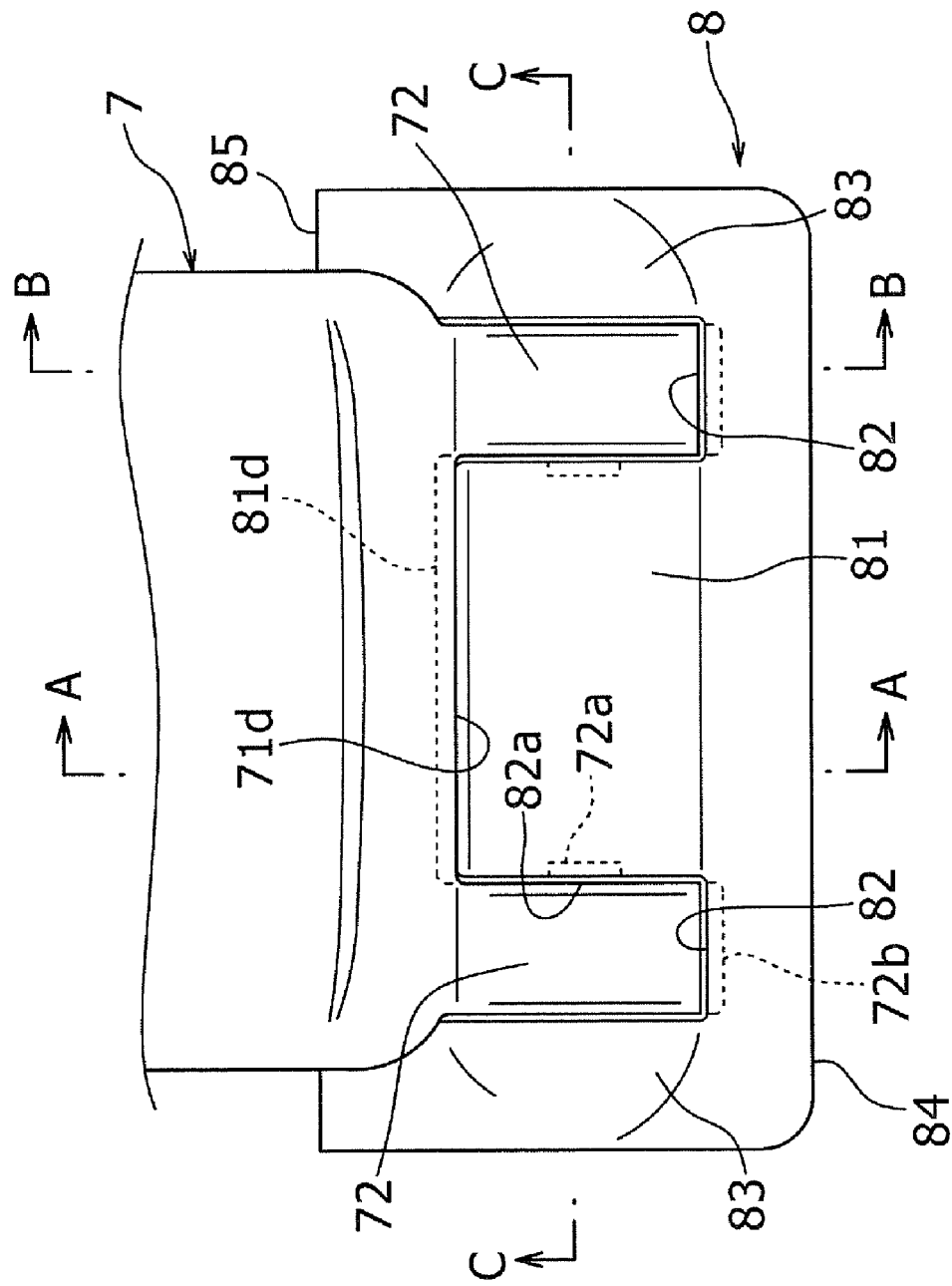
FIG. 9 is a plan view of an essential portion showing an engaged state of a leg cover and a hinge cover.

FIG. 6 is a perspective view showing the installation of the hinge cover 8. In FIG. 8, the hinge cover 8 has a pair of right and left engagement grooves 82 that engage with the movable hinge covering portions 72 of the leg cover 7 so as to allow the pivoting movement of the movable hinge covering portions 72. The engagement grooves 82 are closed in a flat front edge portion 84 of the hinge cover 8, and on the other hand, are opened to the rear edge portions 85 of the hinge cover 8. As shown in FIG. 6, basically, by mounting the hinge cover 8 from the front with respect to the hinge bracket 6, the engagement grooves 82 can be engaged with the movable hinge covering portions 72 of the leg cover 7.

The hinge cover 8 is formed with swollen portions having a cylindrical shape in an intermediate portion 81 located between the engagement grooves 82 and partial spherical shapes in both side portions 83 located on the outside of the engagement grooves 82 continuous with the movable hinge covering portions 72 of the leg cover 7. Respective side portions 83 define spaces for housing the fixed hinge portions 61 of the hinge bracket 6 below. Also, the hinge cover 8 has side surfaces extending downward from the edges on both sides of the engagement grooves 82 so as to form reinforcing structures for the edges of the intermediate portion 81 and both the side portions 83 face to the engagement grooves 82. Both inside edges 82a of the intermediate portion 81 are formed into an arcuate shape corresponding to the engagement edge 72a of the movable hinge covering portion 72 described previously.

On the other hand, unlike a typical hinge bracket, the hinge bracket 6 is formed into a box shape to mount and reinforce the hinge cover 8. Peripheral wall portions 64 and 65 (refer to FIG. 10) of the hinge bracket 6 are formed around a fixed surface 60 fixed to the vehicle body floor 5 so as to connect the fixed hinge portions 61, which are provided upright at both lateral sides of the fixed surface 60, on both front and rear sides as shown in FIG. 5. Furthermore, a support plate 62 is provided between the front and rear peripheral wall portions 64 and 65.

As shown in FIGS. 3 and 4, the hinge bracket 6 is housed in a concave portion in the vehicle body floor 5 and is fixed thereon. Such configuration allows the projections of the hinge bracket 6 and the hinge cover 8 above the vehicle body floor to be kept small while the movable hinge portions 42a each having a relatively large diameter corresponding to the support spring 45 are housed. On the other hand, the support plate 62 lies on almost the same plane as the vehicle body floor 5 with respect to the fixed surface 60 at a lower level of the vehicle body floor 5. In other words, a complementary floor surface is formed in the box-shaped hinge bracket 6 by the support plate 62, and accordingly the expansion of the hinge cover 8 is restrained, and the structural burden is alleviated.

Figure 7:
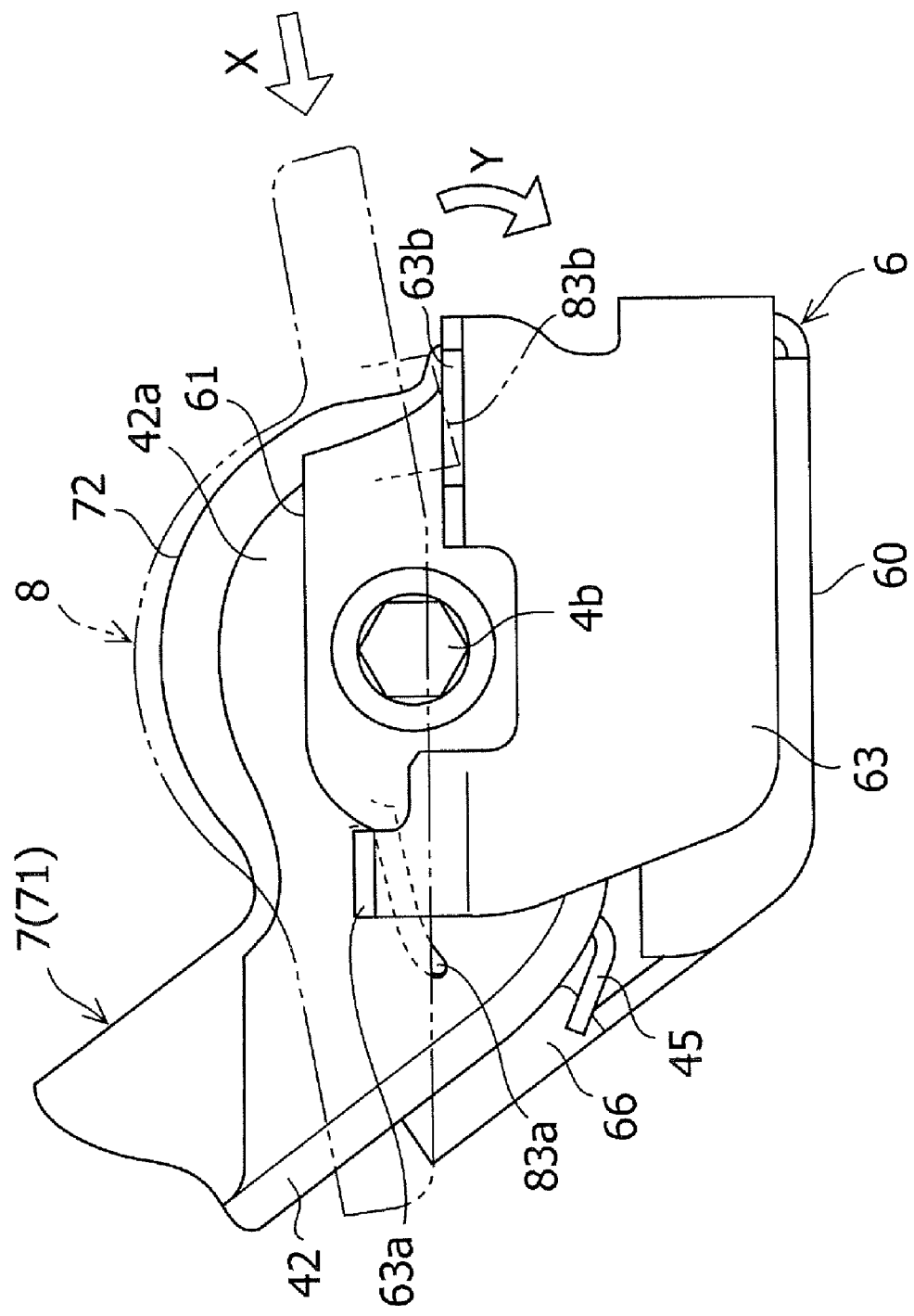
FIG. 7 is a side view of FIG. 6.
Figure 12:
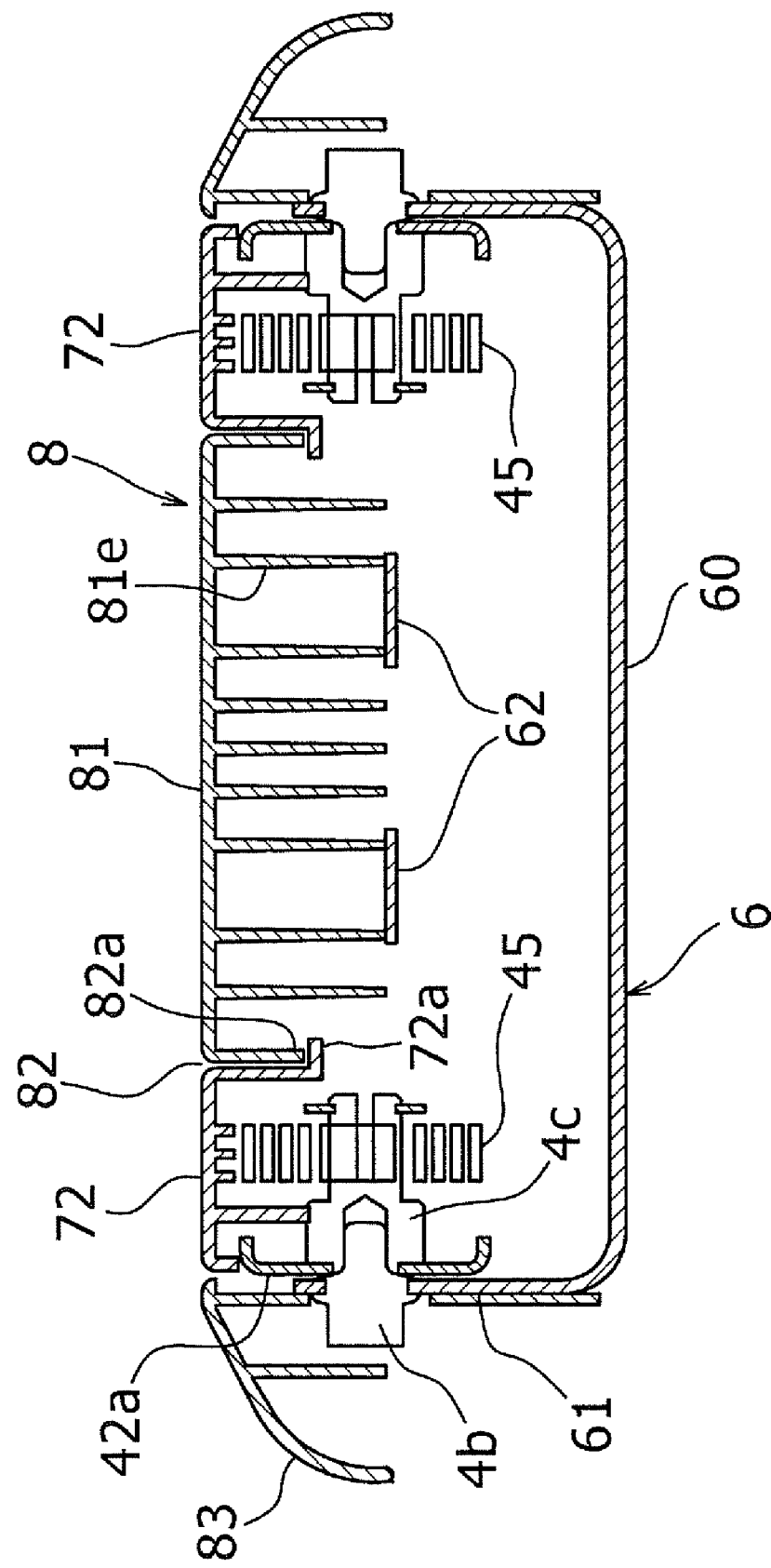
FIG. 12 is a sectional view taken along the line C-C of FIG. 9.

When the hinge cover 8 is installed to the hinge bracket 6 configured as described above, first, the hinge cover 8 is inserted from the front toward the hinge bracket 6 as indicated by the arrow X in FIG. 7, and hooks 83a, projecting on the lower surfaces of both the side portions 83 of the hinge cover 8, are engaged with fixing pieces 63a extended from side plates 63 of the hinge bracket 6. Consequently, hooks 81a, projected from the engagement grooves 82 to the lower surface of the intermediate portion 81 on the inside, are engaged with edge portions 62a (refer to FIG. 10) of the support plate 62. Then, the hinge cover 8 is turned downward around the hooks 81a as indicated by the arrow Y in FIG. 7 so that locking claws 81b and locking claws 83b, both projected downward from the bottom surface located near the front edge portion 84, are engaged with fixing pieces 63b of the hinge bracket 6 and edge portions 62b of the support plate 62. Also, as shown in FIG. 12, reinforcing ribs 81e, projected downward from the bottom of the intermediate portion 81, come into contact with the upper surface of the support plate 62 and are supported.

Since the engagement grooves 82 engage with the movable hinge covering portions 72 of the leg cover 7, the hinge cover 8 mounted as described above can cover the surroundings of the movable hinge covering portions 72 without a gap while allowing the movable hinge covering portions 72 to move along with the pivoting of the leg 4. In addition, as shown in FIG. 12, since the arcuate engagement edges 72a of the movable hinge covering portions 72 overlap on and engage slidably with the lower side of the arcuate inside edges 82a of the engagement grooves 82, the positions of the movable hinge covering portions 72 are regulated over the entire pivoting range of the leg cover 7. In this way, unless the hinge cover 8 is removed, the leg cover 7 cannot be removed.

Figure 10:
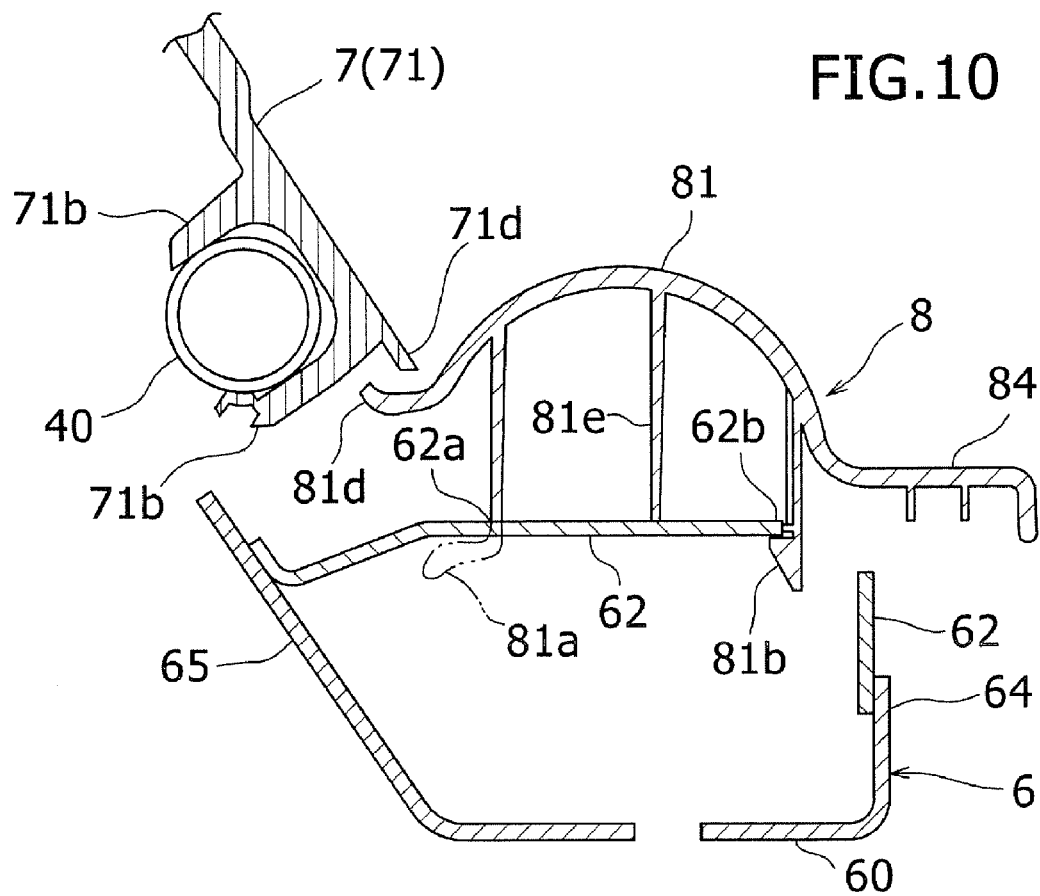
FIG. 10 is a sectional view taken along the line A-A of FIG. 9.
Figure 11:
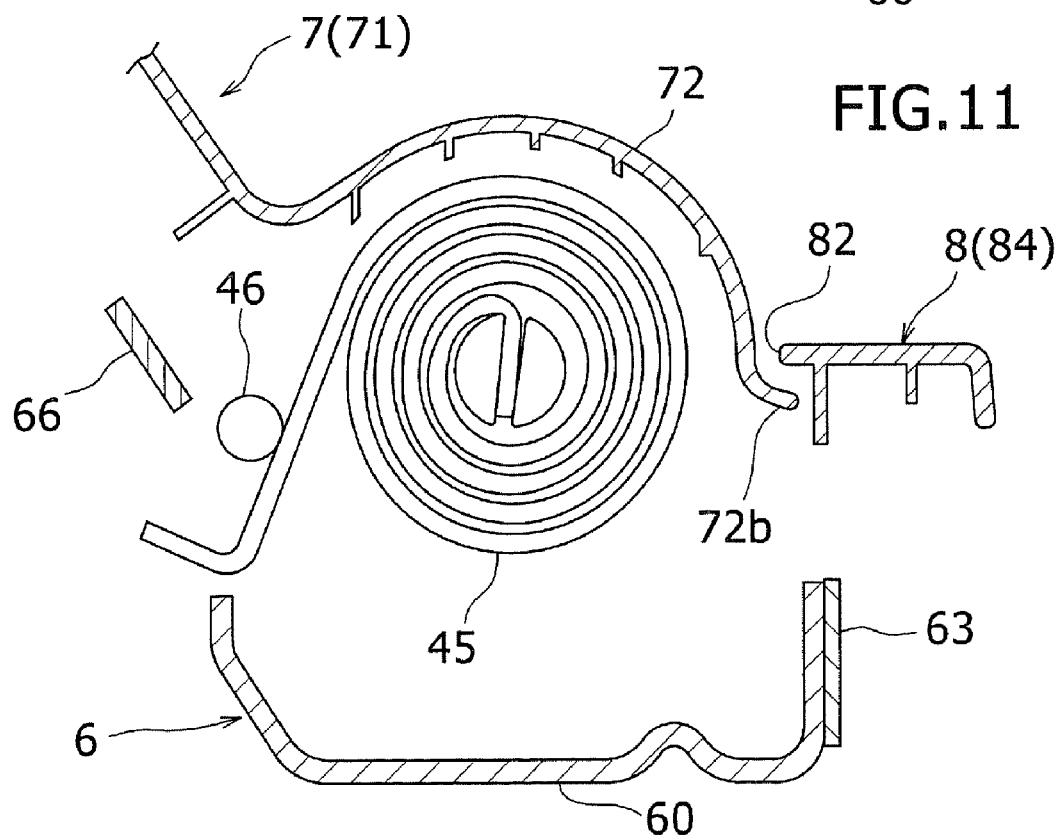
FIG. 11 is a sectional view taken along the line B-B of FIG. 9.

Also, at the pivoting end of the leg 4 corresponding to the seating position of the seat 1, as shown in FIG. 11, the projecting edges 72b at the tip ends of the movable hinge covering portions 72 are located under the edge portions corresponding to the engagement grooves 82, so that the tip ends of the movable hinge covering portions 72 are prevented from being lifted up. In this state, as shown in FIG. 10, an intermediate projecting edge 81d located between the right and left engagement grooves 82 of the hinge cover 8 is located under the lower end intermediate edge 71d of the leg cover 7 extending between the right and left movable hinge covering portions 72, so that the intermediate portion 81 of the hinge cover 8 is prevented from being lifted up.

Therefore, in the seating position of the seat 1 in which a shock is likely to be applied to the leg cover 7 and the hinge cover 8, the leg cover 7 and the hinge cover 8 support each other, so that the edge portions are effectively prevented from being lifted up. Also, the connecting part (71d, 81d) of the leg cover 7 and the hinge cover 8 is closed so that fingers cannot be inserted into the part, and the leg cover 7 can be prevented from being removed intentionally.

The above is a description of an embodiment of the present invention. The present invention is not limited to the above-described embodiment, and various modifications and changes can be made based on the technical concept of the present invention.

For example, in the above-described embodiment, the description has been given of a case in which the leg 4 has the two movable hinge portions 42a provided in parallel and coaxially with the pivoting connection portion (4b), the vehicle body floor 5 is provided with the hinge bracket 6 having the two fixed hinge portions 61 corresponding to the movable hinge portions 42a, the leg cover 7 has the two movable hinge covering portions 72 corresponding to the movable hinge portions 42a, and the hinge cover 8 has the two engagement grooves 82 corresponding to the movable hinge covering portions 72. However, the present invention can be applied to a case in which the two movable hinge portions (42a) of the leg 4 are provided separately on both sides of a single seat or a double or a seat for more, and the two fixed hinge portions (61) of the vehicle body floor 5 are accordingly disposed separately. In this case, the leg cover (7) is mounted individually in each movable hinge portion, each has one movable hinge covering portion (72), the hinge cover (8) disposed independently on each side has one engagement groove (82) corresponding to the movable hinge covering portion, and the intermediate portion 81 is omitted.

Also, in the above-described embodiment, a description has been given of the case in which the engagement edges 72a of the movable hinge covering portions 72 and the arcuate inside edges 82a of the engagement grooves 82 are provided on the intermediate portion 81 side of the movable hinge covering portions 72 and the engagement grooves 82. However, the engagement edges 72a and the inside edges 82a may also be provided on the side portion 83 side or on both sides of the intermediate portion 81 side and the side portion 83 side.

The above is a description of the embodiments of the present invention. The present invention is not limited to the above-described embodiments, and various modifications and changes can be made based on the technical concept of the present invention.

What is claimed is:

1. A leg covering structure for a folding seat, the seat provided with a leg, the leg having a movable hinge portion at the lower end thereof, the movable hinge portion pivotally connected to a fixed hinge portion on the vehicle body floor so that the leg can tilt down forward to fold the seat on a vehicle body floor, the structure comprising:
    a leg cover mounted on the leg to cover the front surface of the leg and the movable hinge portion; and
    a hinge cover mounted on the vehicle body floor to cover the fixed hinge portion;
    wherein the hinge cover has an engagement groove engaging with a movable hinge covering portion of the leg cover so as to allow pivoting of the movable hinge covering portion, and the movable hinge covering portion is provided with an engagement edge on the lateral portion thereof so as to be slidably under the inner periphery side of an inside edge of the engagement groove.

2. The leg covering structure for a folding seat according to claim 1, wherein at the tip end of the movable hinge covering portion, a projecting edge located under the edge portion corresponding to the engagement groove is provided at the pivoting end of the leg corresponding to the seating position of the seat.

3. The leg covering structure for a folding seat according to claim 2, wherein the leg has the two movable hinge portions provided in parallel and coaxially; the vehicle body floor is provided with a hinge bracket having the two fixed hinge portions corresponding to the movable hinge portions; the leg cover has the two movable hinge covering portions corresponding to the movable hinge portions; the hinge cover has the two engagement grooves corresponding to the movable hinge covering portions; the engagement edge is provided in each of the side portions of the movable hinge covering portions; and the projecting edge provided at each of the tip end portions of the movable hinge covering portions.

4. The leg covering structure for a folding seat according to claim 3, wherein in an intermediate portion of the hinge cover located between the engagement grooves, an intermediate projecting edge located under the intermediate edge at the lower end of the leg cover extending between the movable hinge covering portions is provided at the pivoting end of the leg corresponding to the seating position of the seat.

5. The leg covering structure for a folding seat according to claim 1, wherein a spiral spring is mounted on the pivot axis of the movable hinge portion so as to exert a restoring force toward the pivoting position corresponding to the seating position of the seat when the leg is tilted down forward, the spiral spring covered with the movable hinge covering portion.

6. The leg covering structure for a folding seat according to claim 1, wherein the seat comprises a seat cushion arranged in the upper level part of the vehicle body floor at the seating position, and a seat back connected to the rear portion of the seat cushion so as to be folded forward; the upper end of the leg is pivotally connected to the bottom of the seat cushion; and in a state in which the seat back is folded forward and laid on the seat cushion, the leg is tilted forward, whereby the seat can be folded in the lower level part of the vehicle body floor, and on the other hand, in the seating position of the seat, the leg is arranged along the slant surface between the upper level part and the lower level part of the vehicle body floor.

* * * * *